July 1, 1930.  V. P. RUMELY  1,769,313
CYANIDE POT
Filed Dec. 4, 1928
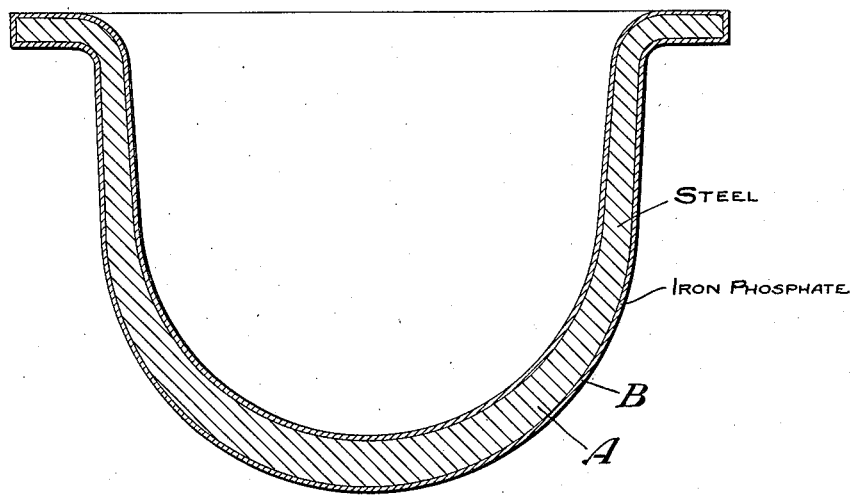
Inventor:
Vincent P. Rumely,
By Macleod, Calver, Copeland & Dike.
Attorneys.

Patented July 1, 1930

1,769,313

UNITED STATES PATENT OFFICE

VINCENT P. RUMELY, OF DETROIT, MICHIGAN, ASSIGNOR TO HUDSON MOTOR CAR COMPANY, OF DETROIT, MICHIGAN, A CORPORATION OF MICHIGAN

CYANIDE POT

Application filed December 4, 1928. Serial No. 323,790.

This invention relates to cyanide pots for use in cyanide hardening of steel parts.

Cyanide hardening is used to a large extent in the heat treatment of steel parts, particularly automobile parts, where a hard surface and tough core are desired. In the practice of cyanide hardening steel parts the work is immersed in a molten bath of cyanide, such as a sodium cyanide, contained in an iron or steel pot suitably heated from the exterior. The work is allowed to remain in the molten cyanide at a temperature usually between 1375° to 1550° F., for a period of time varying with the size of the piece, usually about 25 to 50 minutes, or 20 to 30 minutes after the piece has reached the temperature of the cyanide. It is then removed and quenched in a suitable cool liquid, such as water.

The cyanide pots are short-lived and generally do not last more than from 200 to 225 hours before they begin to blister and leak. It is then necessary to install a new pot, the cost of installation generally being considerably more than the actual cost of the pot. The cost and life of a cyanide pot is an outstanding item in the cost of cyanide hardening. In one large manufacturing plant it has been found that the cost of cyanide hardening per pot is about twenty-one cents per hour.

It is the object of the present invention to provide an improved cyanide pot having an increased life and thereby reduce the cost of cyanide hardening steel articles.

The accompanying drawing is a sectional view of a cyanide pot embodying the invention.

In carrying out the present invention a cyanide pot A composed principally of iron, and preferably of cast steel is provided with a surface coating V containing a phosphate compound. This may be accomplished by immersing or otherwise subjecting the pot to the action of a dilute solution of ordinary phosphoric acid which may have dissolved therein a suitable substance, such as iron filings, ferrous phosphate or other appropriate compound for controlling or regulating the rapidity or strength of the chemical action upon the work undergoing treatment.

In the practice of the invention satisfactory results have been obtained by immersing the cyanide pot in a solution made by dissolving about 12 pounds of iron filings in 10 gallons of ordinary phosphoric acid and adding the solution thus obtained to 125 gallons of hot water. The cyanide pots are immersed in this dilute solution for about four hours and then rinsed with hot water. The pots as thus treated may be colored, if desired, by immersing in an oil soluble dye consisting of three ounces of negrosene to one gallon of benzol.

The cyanide pots of the invention are very resistant to the combined effects of heat and molten cyanide and have an operating life from 350 to 425 hours. Such pots are relatively inexpensive and their use reduces the cost of pots and replacement thereof in cyanide hardening nearly fifty per cent.

What I claim is:

1. A pot for use in cyanide hardening of steel which comprises a vessel composed principally of iron and having a surface coating containing a phosphate compound.

2. A pot for use in cyanide hardening of steel which comprises a vessel composed principally of iron and having a surface coating containing iron phosphate.

In testimony whereof I affix my signature.

VINCENT P. RUMELY.